United States Patent
Wells, III

(10) Patent No.: US 11,932,569 B1
(45) Date of Patent: Mar. 19, 2024

(54) LOW IRON SILICA SAND PRODUCT AND METHOD OF MAKING SAME

(71) Applicant: James M. Wells, III, Macon, GA (US)

(72) Inventor: James M. Wells, III, Macon, GA (US)

( * ) Notice: Subject to any disclaimer, the term of this patent is extended or adjusted under 35 U.S.C. 154(b) by 0 days.

(21) Appl. No.: 18/156,857

(22) Filed: Jan. 19, 2023

(51) Int. Cl.
  *C03C 1/02* (2006.01)
  *B03B 5/34* (2006.01)
  *B03B 5/62* (2006.01)

(52) U.S. Cl.
  CPC .............. *C03C 1/022* (2013.01); *B03B 5/34* (2013.01); *B03B 5/62* (2013.01)

(58) Field of Classification Search
  CPC .. C03C 1/00; C03C 1/022; B03B 5/34; B03B 5/62
  See application file for complete search history.

(56) References Cited

U.S. PATENT DOCUMENTS

2017/0291198 A1* 10/2017 Vallely .................... B03B 9/00

FOREIGN PATENT DOCUMENTS

| CN | 20120064917 A | * | 12/2010 | | |
| CN | 103382087 A | * | 11/2013 | | |
| CN | 102887516 B | * | 4/2014 | | |
| CN | 107051713 A | * | 4/2017 | | |
| CN | 206853887 U | * | 1/2018 | | |
| CN | 108545935 A | * | 9/2018 | ............. | C03B 18/02 |
| CN | 111606553 A | * | 9/2020 | | |
| WO | 2020188459 A1 | | 9/2020 | | |
| WO | WO-2020188459 A1 | * | 9/2020 | ........... | B03C 1/0332 |

OTHER PUBLICATIONS

Buie, B.F. , "The Huber Formation of Eastern Central Georgia", from Short Contributions To the Geology of Georgia, Bulletin 93, State of Georgia Department of Natural Resources, et al., Atlanta, Georgia, 1978, 15 pp.

\* cited by examiner

*Primary Examiner* — Terrell H Matthews
(74) *Attorney, Agent, or Firm* — Myers Bigel, P.A.

(57) ABSTRACT

A method for producing a low iron silica sand product suitable for glass production has an $SiO_2$ content of at least 99.8% by weight, an $Fe_2O_3$ content of less than 0.008% by weight, an $Al_2O_3$ content of less than 0.1% by weight, and a CaO content of less than 0.05% by weight includes preparing a slurry of crude ore, wherein the crude ore has a sand content of about 75% to 80% by weight, a kaolin/mica content of about 15% to 25% by weight, a dark, heavy mineral content of about 1% by weight, and an $Fe_2O_3$ content of about 0.5% to 1.0% by weight. Particles having a size of less than about one hundred forty mesh are removed, and contaminant material is removed. The sand is then separated from the slurry, dried, and passed through a rare earth magnetic separator.

20 Claims, 7 Drawing Sheets

LOW IRON SILICA SAND PRODUCT AND METHOD OF MAKING SAME

FIELD

The present inventive concept relates generally to sand and, more particularly, to sand for use in high purity, low iron glass production.

BACKGROUND

Conventionally, all of the sand produced in the kaolin mining districts of Georgia comes from below the Cretaceous kaolin beds. This strata is where the coarse sand needed for concrete sand can be mined and processed at low cost and supplied to the concrete plants throughout Georgia. Resources of sand from these Cretaceous beds, undivided, are more than adequate to fulfil the demands for many decades. In addition, the younger aged Tertiary beds contain very large quantities of sand that can be processed to make higher grade sand products used in all areas of glass production as well as other higher value products like float glass used in commercial and residential construction, automotive applications, solar glass, glass used in electronics, high tech applications using semi-conductor chips, appliances, fiber optic applications, cosmetic, medical, countertops and renewable energy applications. Estimates of more than a million tons of sand is moved annually in striping kaolin deposits.

Unfortunately, kaolin companies have not found it profitable to process any of the younger sand located above the Cretaceous kaolin beds except for use in mine road construction and as backfill in the mine pits. This is due in part to the high kaolin content for sand production, the low kaolin content for kaolin production, varying levels of mica from 1 to 10 percent, and the relatively small particle size of the sand for use as concrete sand.

SUMMARY

It is an object of the present invention to provide economical and efficient beneficiation methods for continuously cleaning, separating the contaminants and classifying into product specifications the pure quartz sands from the Huber Formation. The beginning material is a sand/kaolin/mica mixture from the Huber Formation with the sand content being approximately 75% to 80% of the mine ore by weight and the kaolin/mica content being 15% to 25% by weight. In addition there is 1% to 2% dark, heavy minerals in the sand portion of the mine ore. The iron content ranges from 0.5% to 1.0% by weight, which has to be lowered to less than 0.03% $Fe_2O_3$ for use in normal glass sand and less than 0.008% in ultra-low iron glass sand.

The low iron silica sand product of the present inventive concept is suitable for all grades of float glass and container glass used in the architectural, automotive, solar glass, scientific, medical, cosmetic, electronic, appliance, renewable energy and lighting fields. In addition, the low iron silica sand product of the present inventive concept is suitable as a feedstock for Cristobalite (a polymorph of silica that is formed at very high temperatures with the same chemical formula as quartz, $SiO_2$, but having a distinct crystal structure and used as the primary component of quartz countertops). In addition, the low iron silica sand product of the present inventive concept is suitable as a feedstock for lower grades of high purity quartz production, (e.g., for use in microelectronics, solar PV applications, fiber optic cladding, high temperature lighting, and other scientific laboratory and medical products).

According to some embodiments of the present inventive concept, a low iron silica sand product is provided that is suitable for all grades of glass production. The sand product is derived from crude ore from the Huber Formation and, in particular, from the Jeffersonville Member or the Marion Member of the Huber Formation having a sand content of about 75% to 80% by weight, a kaolin/mica content of about 15% to 25% by weight, a dark, heavy mineral content of about 1% to 2% by weight, and an $Fe_2O_3$ content of about 0.5% to 1.0% by weight. The low iron silica sand product has an $SiO_2$ content of at least 99.8% by weight, an $Fe_2O_3$ content of less than about 0.008% by weight, an $Al_2O_3$ content of less than about 0.1% by weight, and a CaO content of less than about 0.05% by weight. The low iron silica sand product has less than about 2 ppm for each of chromium, cobalt, copper, nickel, vanadium, and manganese. In addition, the low iron silica sand product has less than about 0.05% by weight for each of MgO, $Na_2O$, $K_2O$, $SO_3$, $ZrO_2$ and $TiO_2$, is devoid of particles have a size greater than about thirty (30) mesh, and is devoid of refractory mineral particles.

According to some embodiments of the present inventive concept, a method for producing a low iron silica sand product comprising an $SiO_2$ content of at least 99.8% by weight, an $Fe_2O_3$ content of less than about 0.008% by weight, an $Al_2O_3$ content of less than about 0.1% by weight, and a CaO content of less than about 0.05% by weight is provided. The method includes preparing a slurry of crude ore and water, wherein the crude ore is from the Huber Formation and, in particular, from the Jeffersonville Member or the Marion Member of the Huber Formation, and wherein the crude ore has a sand content of about 75% to 80% by weight, a kaolin/mica content of about 15% to 25% by weight, a dark, heavy mineral content of about 1% by weight, and an $Fe_2O_3$ content of about 0.5% to 1.0% by weight. Particles are removed from the slurry having a size of less than about one hundred forty (140) mesh via a hydroseparator, and shear forces are applied to particles remaining in the slurry to remove contaminant material attached thereto, for example via attrition scrubber cells. The contaminant material is removed from the slurry via a hydrocyclone, and sand particles having a size greater than thirty (30) mesh are removed via a hydrosizer. The sand is then separated from the slurry, dried, and passed through a rare earth magnetic separator to produce a low iron silica sand product suitable for all grades of glass production.

It is noted that aspects of the present inventive concept described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present inventive concept are explained in detail below.

BRIEF DESCRIPTION OF THE DRAWINGS

The accompanying drawings, which form a part of the specification, illustrate various embodiments of the present inventive concept. The drawings and description together serve to fully explain embodiments of the present inventive concept.

DETAILED DESCRIPTION

Sand products, according to some embodiments of the present inventive concept, are suitable for the manufacturing of "Float Glass", a basic form of glass that is named for its process. The process includes forming molten glass into large flat panels by floating on molten tin. The process produces very smooth, thin large glass panels. Float glass is a common and affordable option for windows, doors or panels. The color of uncoated glass depends on the composition of raw materials used for its production. Standard float glass has a more or less distinct, slightly greenish tint caused by the presence of iron oxide in silica sand, which is the main component for glass production. The production of low iron glass requires extra efforts to improve the quality of silica sand by reducing the amount of impurities which color glass, especially iron. As a result, low iron glass comes at a higher cost, but it has very clear, colorless look, which makes it especially suitable for thick, laminated glass compositions and in other cases where high light transmission or color rendering is required.

Sand products, according to some embodiments of the present inventive concept, are also suitable for container glass used in the architectural, automotive, scientific, and lighting industries, and as a feedstock for Cristobalite, which is a polymorph of silica that is formed at very high temperatures with the same chemical formula as quartz, $SiO_2$, but with a distinct crystal structure and used as the primary component of quartz countertops. Sand products, according to some embodiments of the present inventive concept, are also suitable as a feedstock for high purity quartz production, for example, in making microelectronic parts, in solar photovoltaic (PV) applications, fiber optic cladding, high temperature lighting, and other high technology scientific laboratory and medical products.

Figure 1A:
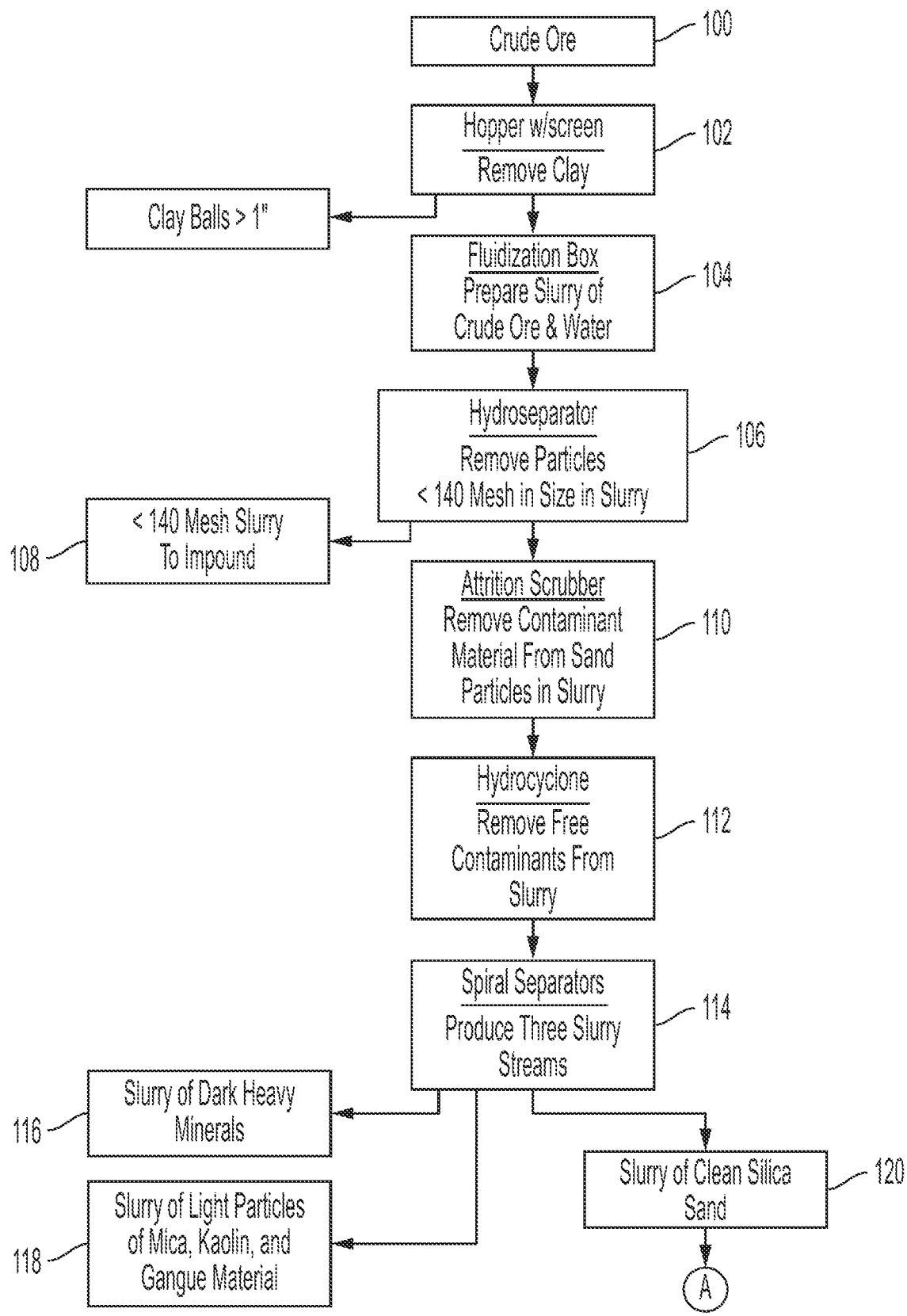
FIGS. 1A-1B illustrate a method for producing a low iron silica sand product according to some embodiments of the present inventive concept.
Figure 1B:
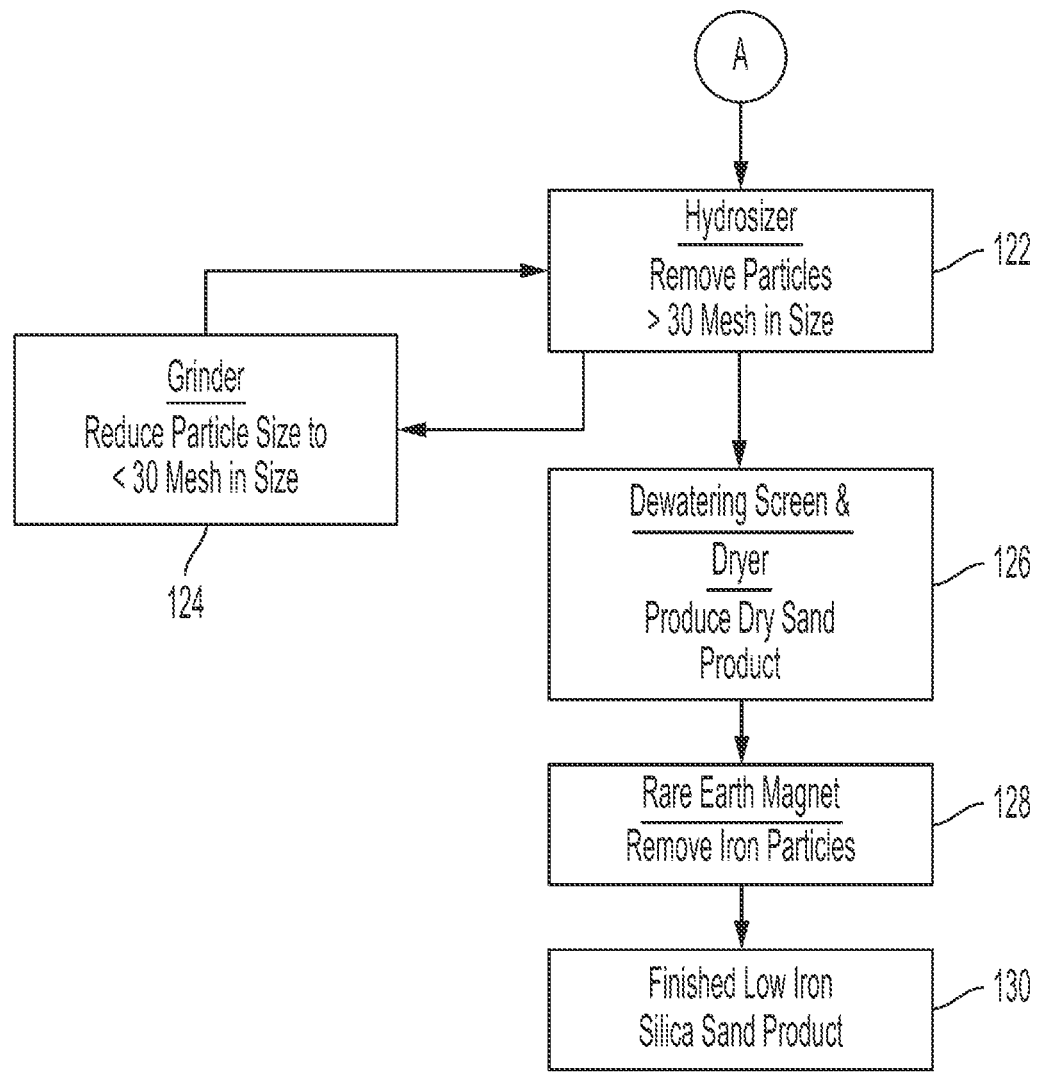

Referring to FIG. 1A-1B, a method for producing a low iron silica sand product according to some embodiments of the present inventive concept, is illustrated. Crude ore having a sand content of about 75% to 80% by weight, a kaolin/mica content of about 15% to 25% by weight, a dark, heavy mineral content of about 1% by weight, and an $Fe_2O_3$ content of about 0.5% to 1.0% by weight is mined from a source (Block 100). The source of the crude ore is the Jeffersonville Member or the Marion Member of the Huber Formation in Georgia, USA. The Huber Formation is the name for all the post-Cretaceous pre-Jackson strata in the kaolin mining districts of Georgia, northeast of the Ocmulgee River. The sequence of strata can be traced from the vicinity of Macon, Georgia, on the Ocmulgee River eastward through the Wrens District, near the Savannah River at the east margin of the State. The base of the Huber Formation is an unconformity marking the break between Cretaceous (Mesozoic) and Tertiary (Cenozoic) time.

The Huber Formation has become extensively exposed in Twiggs County, Georgia wherever mines have been opened from the vicinity of Dry Branch and Stone Creek on the northwest to Flat Creek on the southeast, a distance of about five miles. This can be considered as the type locality of the formation. In this region, the Huber Formation is a wedge-shaped unit between the undifferentiated Cretaceous and the Jackson age strata. It wedges out updip, where it is truncated by a middle Eocene or more recent erosion surface. The formation is about 65 feet (19.8 meters) thick northeast of Huber, Georgia and increases to 94 feet (28.7 meters) thick 4.7 miles (7.5 km) downdip, in a mine in the valley of Flat Creek, north of Marion, Georgia.

The mined crude ore is processed through a feed hopper equipped with a screw conveyor in the bottom and a vibratory screen attached on top to remove clay, and particularly clay balls greater than about one inch (1") in diameter (Block 102).

Figure 2:
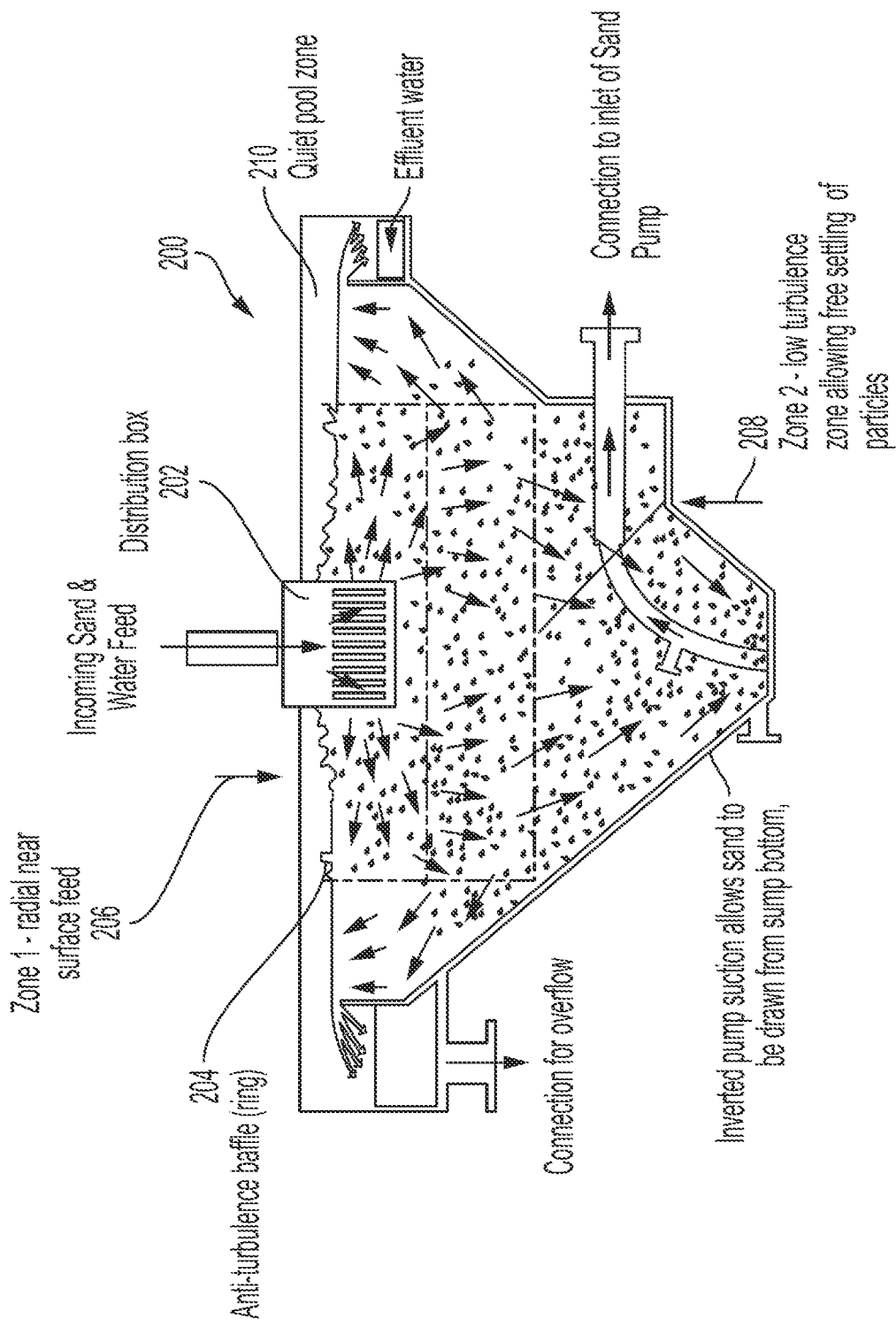
FIG. 2 illustrates a feed regulating sump that may be utilized in accordance with some embodiments of the present inventive concept.

The minus one inch crude ore then discharges from the bottom of the feed hopper onto a conveyor belt mounted on a 20 degree incline designed to convey 50 tons per hour into the sand plant. The crude ore discharges from the end of the conveyor belt into a fluidization box where it is mixed with 675 gallons per minute of fresh and recycled water to produce a slurry (Block 104) which is fed into a pre-wash system that is unique in its application of producing low iron glass sand in that it replaces conventional screw classifiers. The advantages over conventional sand screw classifiers begin when the slurry enters the distribution box 202 of a feed regulating sump 200 (FIG. 2). The distribution box 202 directs the feed radially, which prevents solids from dropping too fast and thus allowing the sand to be evenly distributed across the conical shaped, feed regulating sump 200. The feed regulating sump is equipped with two baffle rings 204 which create three distinct zones within the feed regulating sump 200. In the first zone 206, radial, near surface distribution of feed discharging from the distribution box permits any air entrained in the feed to be vacated, helping to prevent pump cavitation. The second zone 208 is an anti-turbulence area that reduces outwards velocity of sand to zero and initiates free settling action. The third zone 210 is a quiet pool zone that allows kaolin, mica and excess water to gently overflow into a collecting trough, which connects to a discharge pipe and is sent to impound storage. (Block 104).

The crude ore slurry is pumped from the feed regulating sump 200 by a 30 horsepower, rubber lined pump into the feed box of a hydroseparator at a pressure of between about 0.045-0.15 bars (0.65 psi-2.17 psi) and a suitable consistency of approximately 50%, depending on the particle size desired for the finished product. An exemplary hydroseparator that may be utilized is available from McLanahan Corporation, Hollidaysburg, Pennsylvania. However, embodiments of the present inventive concept are not limited to any particular type of hydroseparator. Due to the rotation caused by the tangential entry into the feed box of the hydroseparator, the solids are thrown outwards and then pass downwards under gravity into the cone of the hydroseparator and out through a discharge regulator. The underflow discharge contains the majority of the desired finished product. The water, together with the silts and clays passes upwards through the vortex finder and through the overflow to waste. The overflow pipework acts as a syphon, creating a negative pressure in the separator. This holds the discharge regulator closed unless solids are present. The discharge regulator then opens under the weight of the solids to allow for discharge. In practice, the underflow comprises the whole of the solids fed in, minus the silts, clays and heavy minerals with approximately 20% of the water. The overflow will comprise the greater part of the water with most of the silts and clays having a size smaller than about one hundred forty (140) mesh (Block 106). The portion of the slurry containing the smaller (<140 mesh) particles may be pumped to an impound (Block 108).

Figure 3:
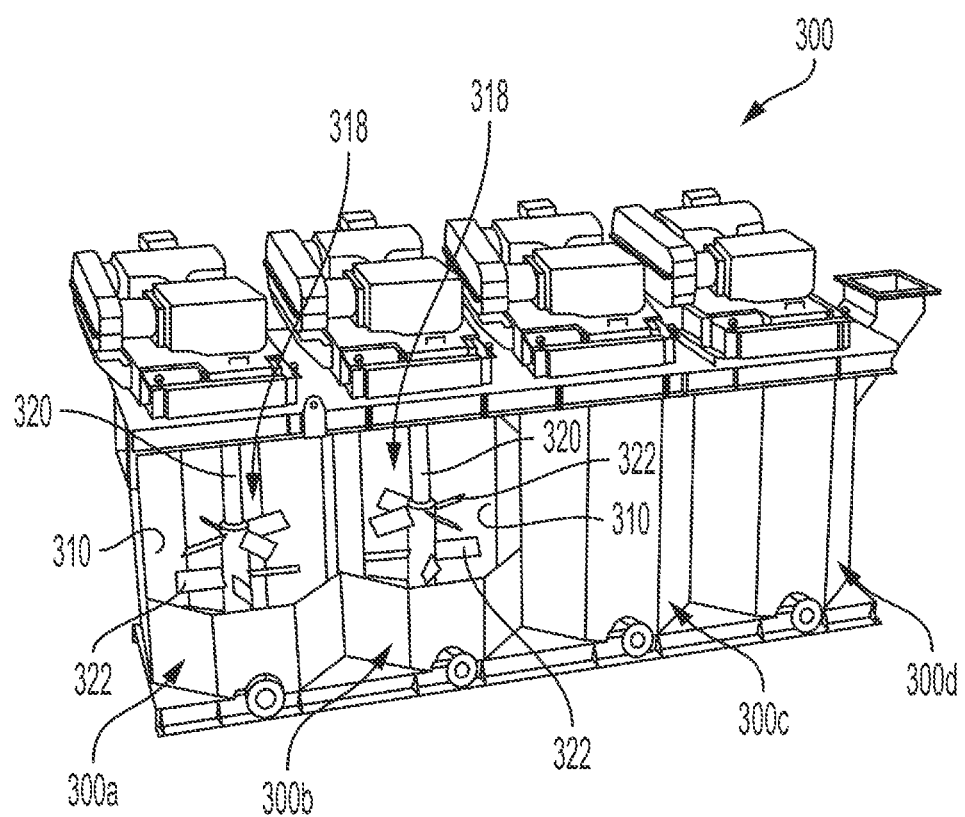
FIG. 3 illustrates two pair of attrition scrubber cells that may be utilized in accordance with some embodiments of the present inventive concept. The first pair of attrition scrubber cells are in cutaway view to illustrate the polygonal configuration of the internal chamber of each scrubber cell.

The portion of the slurry containing particles having a size greater than one hundred forty (>140) mesh is then processed with two pair of identical attrition scrubber cells 300 (FIG. 3) that are configured to remove contaminant material from the sand particles in the slurry (Block 110). The attrition scrubber cells 300 utilized are unique in several ways over conventional attrition cells. Each attrition scrubber cell 300 has an polygonal-shaped (e.g., octagonally shaped) internal chamber 310 that is configured to prevent any dead zones by inducing a folding of the slurry which cannot be achieved when processing with a circular shaped tank. The slurry is also made more turbulent in order to help achieve the strongest possible attrition of particle surfaces without reduction in particle size, by constructing the stirrer blades as described below. High torque motors 312 optimize the attritioning effect at a solids to water content of 70 to 80 percent solids. Each motor 312 and gearbox 314 are connected via a V-belt 316 to a respective stirrer 318. Each stirrer 318 includes a vertically oriented rotatable shaft 320 having multiple levels of stirrer blades 322 with unique blade profiles, as illustrated in FIG. 4.

Figure 4:
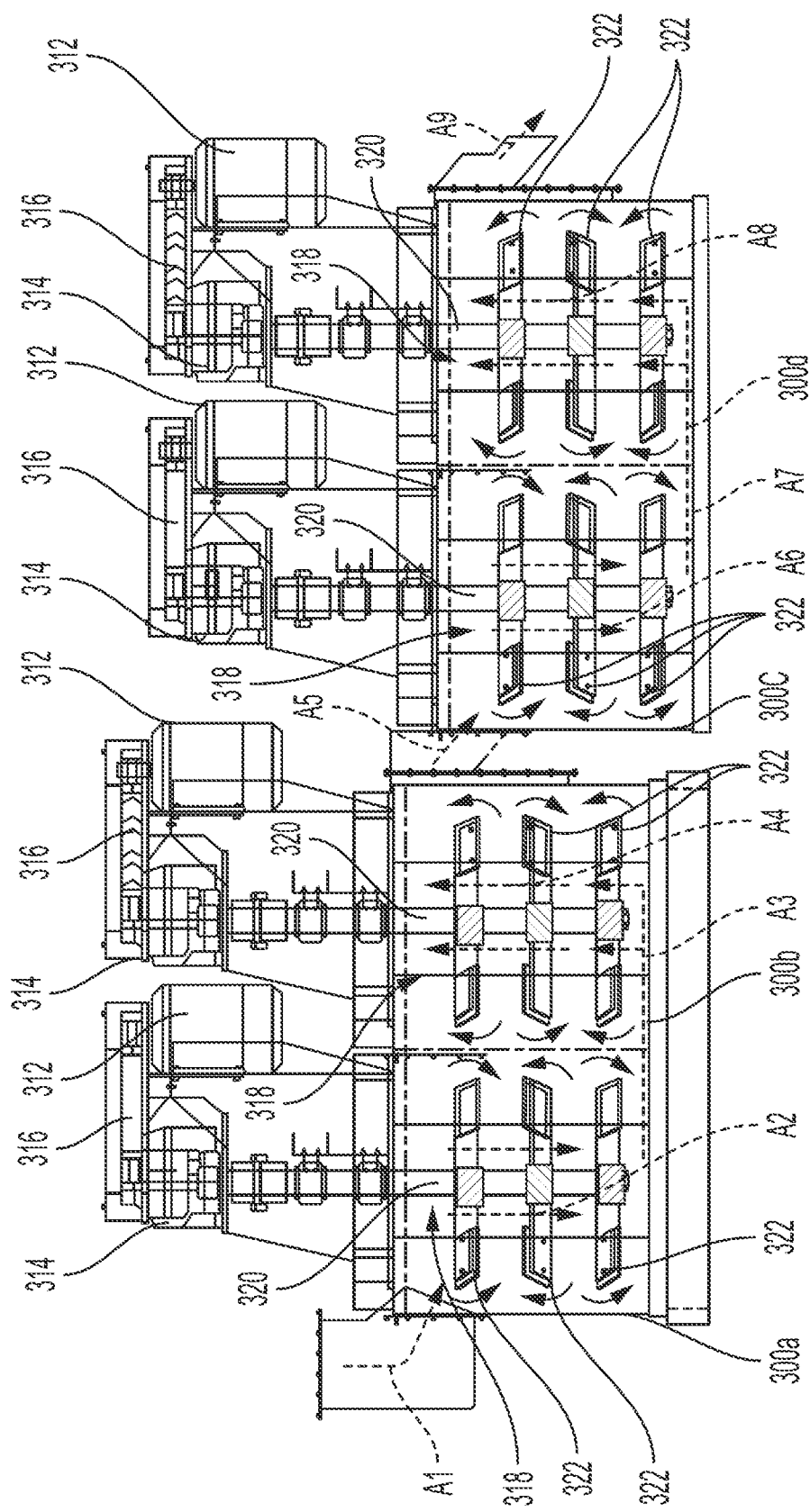
FIG. 4 illustrates the flow of product slurry through the attrition scrubber cells of FIG. 3.

As illustrated in FIG. 4, blades 322 at each level have an orientation angle that is different from the blades 322 at an adjacent level. The blades 322 are coated with abrasion resistant rubber (hot vulcanized 10 mm thick) or polyurethane, 12-15 mm. The attrition scrubber cells 300 are configured to perform a scrubbing process of applying a shear force to the sand particles in the slurry, which causes any contaminant particles attached to the sand particles to be removed. In the illustrated embodiment, four attrition scrubber cells 300a, 300b, 300c, 300d are utilized. The flow of the slurry through the attrition scrubber cells 300a, 300b, 300c, 300d is illustrated in FIG. 4. The slurry enters the first attrition scrubber cell 300a as indicated by arrow A1. The slurry undergoes a scrubbing process in the first attrition scrubber cell 300a in the direction indicated by arrow A2, then flows to the second attrition scrubber cell 300b, indicated by arrow A3, and undergoes a scrubbing process in the second attrition scrubber cell 300b in the direction indicated by arrow A4. The slurry then flows into the third attrition scrubber cell 300c indicated by arrow A5. The slurry undergoes a scrubbing process in the third attrition scrubber cell 300c in the direction indicated by arrow A6, then flows to the fourth attrition scrubber cell 300d, indicated by arrow A7, and undergoes a scrubbing process in the fourth attrition scrubber cell 300d in the direction indicated by arrow A8. The slurry then flows out of the fourth attrition scrubber cell 300d as indicated by arrow A9. An exemplary attrition cell as described and that may be utilized is available from Terex Corporation, Norwalk, Connecticut.

The slurry is then pumped from the attrition scrubber cells 300 with a 30 horsepower rubber lined pump to a cluster of four Cavex 2 hydrocyclones (available from The Weir Group PLC, Glasgow, Scotland) that are configured to remove the ultrafine deleterious contaminant particles generated by the attrition scrubber cells 300 and suspended within the slurry (Block 112). However, the hydrocyclones can be any type of structure that is configured to classify, separate or sort particles in a liquid suspension.

Figure 5A:
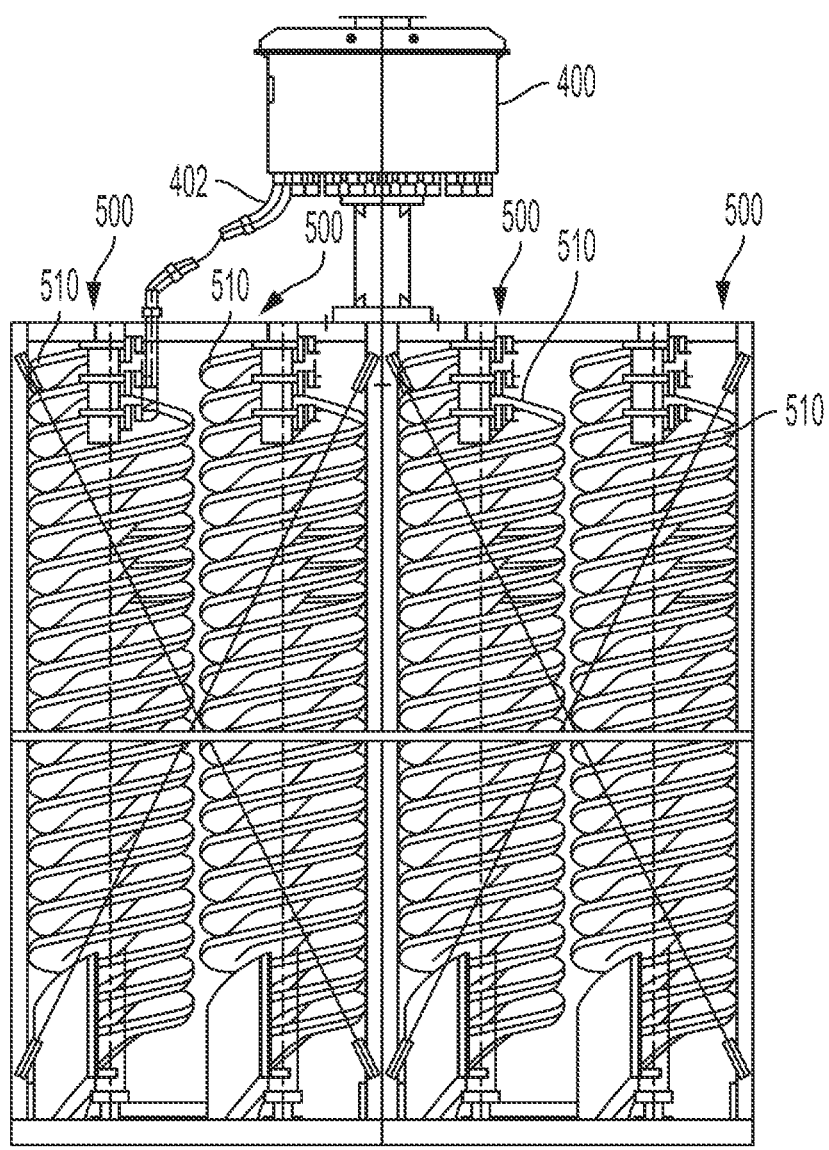
FIG. 5A illustrates a plurality of spiral separators that may be utilized in accordance with some embodiments of the present inventive concept.
Figure 5B:
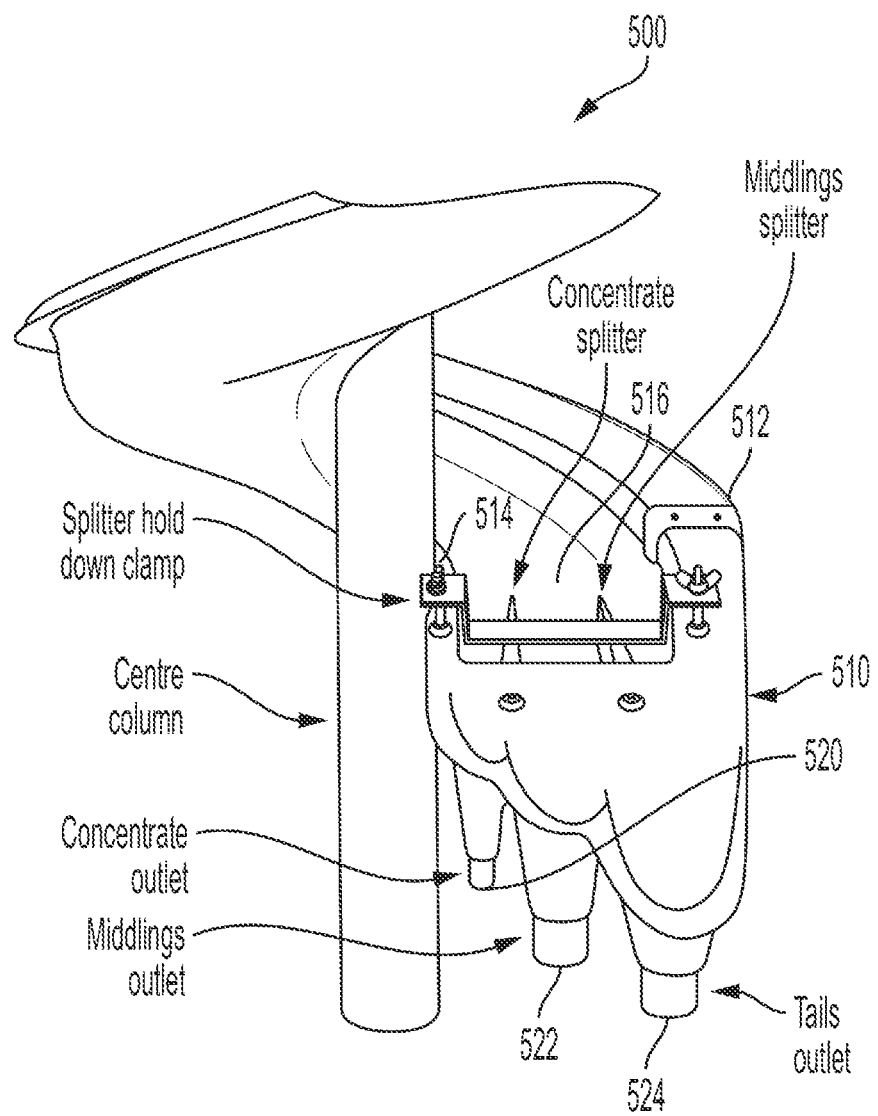
FIG. 5B illustrates the chute of one of the spiral separators of FIG. 5A.

The slurry is discharged from the hydrocyclones into a distribution box 400 that is connected to multiple spiral separators 500 via flexible hoses 402, as illustrated in FIG. 5A. The spiral separators 500 are sorting devices that separate solid material in a slurry by using gravity and centrifugal forces via spiral chutes 510. An exemplary spiral separator 500 that may be utilized is available from Terex Corporation, Norwalk, Connecticut. However, embodiments of the present inventive concept are not limited to any particular type of spiral separator. Approximately 400 to 500 gallons per minute is pumped to the spiral distribution box 400 to achieve a 15 to 20 percent solids to water ratio, thus allowing the spiral separators to function at the optimum levels. Lighter particles (kaolin, mica, etc.) are more readily suspended in water and attain relatively high tangential velocities moving to the outside rim 512 of each spiral chute 510 (FIG. 5B). Heavier and larger particles experience greater friction and drag forces thus move slower keeping them on the inside rim 514 of each spiral chute 510, or in the middle portion 516 of each spiral chute 510. The desired glass sand product is in the middle portion of each spiral chute 510. The inside heavy mineral sand will be a by-product and the outside kaolin/mica stream will be a waste stream pumped to an on-site impound storage. The differing densities and hydrodynamic properties of particles present in the slurry allow for this separation. With no moving parts, spiral separators have low energy requirements. Configured to generate three slurry product streams, control parameters include feed distribution, splitter adjustment, feed slurry density, feed rate and wash water rate. (Block 114).

As described above, each spiral separator has a spiral chute 510 that separates particles of different densities using centrifugal force as the slurry flows down the chute. The discharge 520 from the inside portion 514 of each spiral chute 510 (FIG. 5B) will contain dark heavy minerals (Block 116), the discharge 522 from the middle portion 414 of each spiral chute 510 (FIG. 5B) will contain the clean silica sand product (Block 120), and the outside discharge 524 from the outside portion 514 of each spiral chute 510 (FIG. 5B) will contain the light particles of mica, kaolin and any remaining light gangue substances (Block 118). The discharge from the inside portion of each spiral chute 510 may be pumped to a dewatering screen, to drain dry and be shipped as a feedstock. The light particle discharge 524 from the outer portion of each spiral chute 510 may be pumped to an impound storage area for further processing.

The discharge 522 from the middle portion of each spiral chute 510 gravity flows into a sump tank with a 15 hp electric motor and is pumped using a rubber lined suction pump into a hydrosizer. An exemplary hydrosizer that may be utilized is available from McLanahan Corporation, Hollidaysburg, Pennsylvania. However, embodiments of the present inventive concept are not limited to any particular type of hydrosizer. The hydrosizer then processes the sand slurry upward using water flow velocities to make the proper particle size distribution classification and to remove any particles of sand having a size larger than thirty (30) mesh (Block 122). The properly sized sand consisting of a particle size distribution of a particles smaller than 30 mesh and larger than 80 mesh are discharged into a sump tank equipped with a electric motor and pump and pumped to a final cleaning step in a hydrocyclone which discharges onto a vibratory de-watering screen with an 80 mesh screen panel. The dewatered sand is dropped on a conveyor belt and delivered to an open top feed hopper with a screw conveyor in the bottom, designed to feed a rotary dryer using natural gas and capable of processing the sand feed at 30 at a rate of tons per hour with less than 1% moisture. (Block 126) The slurry containing particles larger than thirty (30) mesh are processed through a grinder to reduce the particle size and this slurry is pumped back to the hydrosizer (Block 124).

The dried sand product is then processed by a magnetic separator to remove any remaining iron and other magnetic or paramagnetic particles (Block 128). For example, in some embodiments, the dried sand product is conveyed into a feed hopper with a 50 ton capacity. The discharge from the feed hopper is conveyed through a roll separator (e.g., a "Flanmag" roll separator available from Magquip, Maraisburg, South Africa). The roll separator eliminates the role and reliance upon centrifugal force enhancing separation efficiency and increases feed rate at a lower cost. The Flanmag roll separator is described in published PCT Application WO 2020/188459, which is incorporated herein by reference in its entirety, and is a two roll (head and tail) rare earth magnet assembly with thin (aramid Kevlar) conveyor belt, with a "placement" feed method to the primary roll and belt. The roll separator causes the material feed to separate into non-magnetic and magnetic fractions on initial roll impact. There is no middlings fraction. The non-magnetic and magnetic fractions travel in opposite directions. No splitter plate is required and only a single pass is usually required for complete separation. The roll separator is configured to separate dry granular paramagnetic material in the 75 microns to 1 mm size range.

In some embodiments, each roll has a diameter of 220 mm and a width of 1000 mm. The non-magnetic portion of sand coming from the roll separator is conveyed into polyurethane lined load out hoppers for truck or rail delivery to customers. The magnetic portion is retained as a by-product for sale. (Block 128). The resulting sand product is a low iron silica sand product suitable for all grades of glass production and has an $SiO_2$ content of at least 99.8% by weight, an $Fe_2O_3$ content of less than about 0.008% by weight, an $Al_2O_3$ content of less than about 0.1% by weight, and a CaO content of less than about 0.05% by weight. However, other types of magnetic separators may be utilized in accordance with embodiments of the present inventive concepts.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A low iron silica sand product suitable for all grades of glass production, the sand product derived from crude ore having a sand content of about 75% to 80% by weight, a kaolin/mica content of about 15% to 25% by weight, a dark, heavy mineral content of about 1% to 2% by weight, and an $Fe_2O_3$ content of about 0.5% to 1.0% by weight, the low iron silica sand product comprising an $SiO_2$ content of at least 99.8% by weight, an $Fe_2O_3$ content of less than about 0.008% by weight, an $Al_2O_3$ content of less than about 0.1% by weight, and a CaO content of less than about 0.05% by weight.

2. The low iron silica sand product of claim 1, wherein the low iron silica sand product comprises less than about 2 ppm for each of chromium, cobalt, copper, nickel, vanadium, and manganese.

3. The low iron silica sand product of claim 1, wherein the low iron silica sand product comprises less than about 0.05% by weight for each of MgO, $Na_2O$, $K_2O$, $SO_3$, $ZrO_2$ and $TiO_2$.

4. The low iron silica sand product of claim 1, wherein the low iron quartz sand is devoid of particles have a size greater than about thirty (30) mesh.

5. The low iron silica sand product of claim 1, wherein the low iron quartz sand is devoid of refractory mineral particles.

6. The low iron silica sand product of claim 1, wherein the crude ore is from a post-Cretaceous strata.

7. The low iron silica sand product of claim 6, wherein the crude ore is from the Jeffersonville Member or the Marion Member of the Huber Formation.

8. A method for producing a low iron silica sand product comprising an $SiO_2$ content of at least 99.8% by weight, an $Fe_2O_3$ content of less than about 0.008% by weight, an $Al_2O_3$ content of less than about 0.1% by weight, and a CaO content of less than about 0.05% by weight, the method comprising:

preparing a slurry of crude ore and water, wherein the crude ore has a sand content of about 75% to 80% by weight, a kaolin/mica content of about 15% to 25% by weight, a dark, heavy mineral content of about 1% by weight, and an $Fe_2O_3$ content of about 0.5% to 1.0% by weight;

removing particles from the slurry having a size of less than about one hundred forty (140) mesh;

applying shear forces to particles remaining in the slurry to remove contaminant material attached to the particles;

separating the contaminant material from the slurry;

separating sand from the slurry;

drying the sand; and then feeding the dried sand through a rare earth magnetic separator to produce a low iron silica sand product suitable for all grades of glass production.

9. The method of claim 8, further comprising removing sand particles having a size greater than thirty (30) mesh prior to the drying step.

10. The method of claim 8, wherein removing particles from the slurry having a size of less than about one hundred forty (140) mesh is performed using a hydroseparator.

11. The method of claim 8, wherein applying shear forces to particles remaining in the slurry to remove contaminant material attached to the particles is performed using at least one attrition scrubber comprising a polygonal-shaped internal chamber.

12. The method of claim 8, wherein separating the contaminant material from the slurry is performed using a hydrocyclone.

13. The method of claim 8, wherein separating the sand from the slurry comprises separating the sand into three separate slurry streams using at least one spiral concentrator.

14. The method of claim 8, wherein the crude ore is from a post-Cretaceous strata.

15. The method of claim 14, wherein the crude ore is from the Huber Formation.

16. A method for producing a low iron silica sand product comprising an $SiO_2$ content of at least 99.8% by weight, an $Fe_2O_3$ content of less than about 0.008% by weight, an $Al_2O_3$ content of less than about 0.1% by weight, and a CaO content of less than about 0.05% by weight, the method comprising:

preparing a slurry of crude ore and water, wherein the crude ore is from a post-Cretaceous strata and has a sand content of about 75% to 80% by weight, a kaolin/mica content of about 15% to 25% by weight, a dark, heavy mineral content of about 1% by weight, and an $Fe_2O_3$ content of about 0.5% to 1.0% by weight;

removing particles from the slurry having a size of less than about one hundred forty (140) mesh;

applying shear forces to particles remaining in the slurry to remove contaminant material attached to the particles;

separating the contaminant material from the slurry;

separating sand from the slurry and removing sand particles having a size greater than thirty (30) mesh;

drying the sand; and then feeding the dried sand through a rare earth magnetic separator to produce a low iron silica sand product suitable for all grades of glass production.

17. The method of claim 16, wherein the post-Cretaceous strata is the Jeffersonville Member or the Marion Member of the Huber Formation.

18. The method of claim 16, wherein removing particles from the slurry having a size of less than about one hundred forty (140) mesh is performed using a hydroseparator.

19. The method of claim 16, wherein applying shear forces to particles remaining in the slurry to remove contaminant material attached to the particles is performed using at least one attrition scrubber comprising a polygonal-shaped internal chamber.

20. The method of claim 16, wherein separating the contaminant material from the slurry is performed using a hydrocyclone, and wherein separating the sand from the slurry comprises separating the sand into three separate slurry streams using at least one spiral concentrator.

\* \* \* \* \*